(12) United States Patent
Ai

(10) Patent No.: US 12,625,707 B2
(45) Date of Patent: May 12, 2026

(54) SYSTEM AND METHOD FOR SYSTEM EXTENSIBILITY

(71) Applicant: SAP SE, Walldorf (DE)

(72) Inventor: Zhijie Ai, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/629,508

(22) Filed: Apr. 8, 2024

(65) Prior Publication Data

US 2025/0315266 A1     Oct. 9, 2025

(51) Int. Cl.
| | |
|---|---|
| *G06F 7/00* | (2006.01) |
| *G06F 9/30* | (2018.01) |
| *G06F 9/38* | (2018.01) |

(52) U.S. Cl.
CPC ........ *G06F 9/3836* (2013.01); *G06F 9/30181* (2013.01)

(58) Field of Classification Search
CPC ............... G06F 9/3836; G06F 9/30181; G06F 16/2474; G06F 16/902
See application file for complete search history.

(56) References Cited

U.S. PATENT DOCUMENTS

| | | | | |
|---|---|---|---|---|
| 5,892,900 A * | 4/1999 | Ginter | ..................... | H04L 63/20 |
| | | | | 726/26 |
| 6,289,382 B1 * | 9/2001 | Bowman-Amuah | ........................ | |
| | | | | G06F 13/387 |
| | | | | 709/226 |

| | | | | |
|---|---|---|---|---|
| 6,473,794 B1 * | 10/2002 | Guheen | .................... | H04L 43/50 |
| | | | | 709/224 |
| 8,352,505 B1 * | 1/2013 | Venkataramani | ....... | G06F 30/30 |
| | | | | 707/769 |
| 8,429,607 B2 * | 4/2013 | Son | ........................... | G06F 8/75 |
| | | | | 717/100 |
| 11,381,638 B1 * | 7/2022 | Devta | ..................... | H04L 67/10 |
| 12,270,929 B2 * | 4/2025 | Ottosson | ................. | G01S 7/023 |
| 2006/0161888 A1 * | 7/2006 | Lovisa | ...................... | G06F 8/36 |
| | | | | 717/107 |
| 2008/0229278 A1 * | 9/2008 | Liu | ........................... | G06F 8/36 |
| | | | | 717/106 |
| 2008/0320497 A1 * | 12/2008 | Tarkoma | ............... | G06F 9/4856 |
| | | | | 703/23 |
| 2010/0070448 A1 * | 3/2010 | Omoigui | ............. | H10F 39/1825 |
| | | | | 706/55 |
| 2010/0114939 A1 * | 5/2010 | Schulman | ........... | G06F 11/3672 |
| | | | | 707/769 |
| 2011/0022198 A1 * | 1/2011 | Plache | ............. | G05B 19/41845 |
| | | | | 700/86 |
| 2013/0339936 A1 * | 12/2013 | Boulos | ................ | G06F 9/45508 |
| | | | | 717/153 |

(Continued)

*Primary Examiner* — Mohammed R Uddin
(74) *Attorney, Agent, or Firm* — Buckley, Maschoff & Talwalkar LLC

(57) ABSTRACT

According to some embodiments, systems and methods are provided including a memory storing processor-executable code; and a processing unit to execute the processor-executable program code to cause the system to: receive a request for a sequence, the sequence including two or more components; identify one or more possible sequences based on the request; build a sequence based on the identified one or more possible sequences, wherein building the sequence includes adding an extension to the sequence; validate the built sequence; and store the validated sequence. Numerous other aspects are provided.

14 Claims, 18 Drawing Sheets

(56)                 References Cited

U.S. PATENT DOCUMENTS

2014/0337816 A1*  11/2014  Chiluvuri .................. G06F 8/20
                                                717/107
2019/0171438 A1*   6/2019  Franchitti ................ G06N 3/08

* cited by examiner

1000

| COMPONENT ID | EXTENSION | SUB-EXTENSION | PROCEDURE | SEQUENCE | PROCEDURE EXTENSION |
|---|---|---|---|---|---|
| C_10001 | E_204 | E_204a | A | | |
| C_10001 | E_205 | N/A | A | | |
| C_10002 | E_206 | E_206a | B | | |
| C_10003 | E_207 | E_207a | A | | |

SYSTEM AND METHOD FOR SYSTEM EXTENSIBILITY

BACKGROUND

As organizations evolve, computer platforms (including a hardware system and an operating system) supporting the organizations become larger and more complex. For example, when a system is updated, the updates may be added to the system instead of replacing elements of the systems. Additionally, it may be difficult to re-use elements from a prior iteration, thereby requiring other new elements. The accumulation of the new elements, including updates, to the system without removing older elements of the system may result in technical debt. As a result, with each update and change, it may be more difficult to add updates and changes as the platform resources may not be available.

Systems and methods are desired which support the expansion of system architecture.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
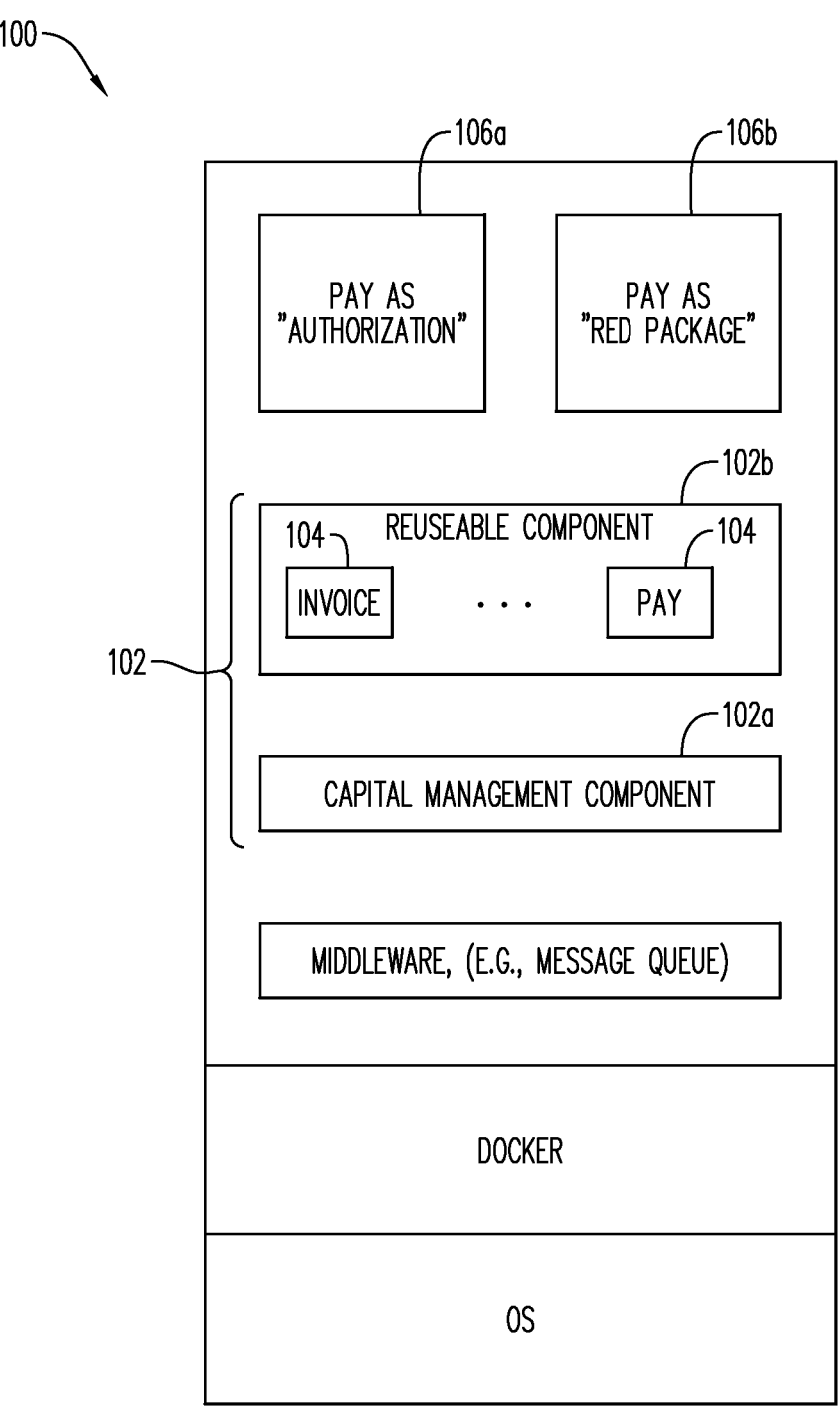
FIG. 1 is a block diagram of a system.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, as organizations evolve, computer platforms (including a hardware system and an operating system) supporting the organizations become larger and more complex. Over time, the systems used by the organization become legacy systems (e.g., systems including outdated: computer hardware, software applications, file formats and programming languages). Components may be a part of these legacy systems. A component may be an independent and reusable part of an application. The component may define a deliverable and product unit of a software product. The component may be built out of types (e.g., char, integer, string types, etc.) and functions, encapsulated together. An application may use components from different locations compared to where the application is running. Thus, components may be developed by different development teams and be used in different projects. Often due to the organization changes and needs, it is difficult to extend and/or re-use the existing components to meet organization needs.

As a non-exhaustive example, consider the system 100 of FIG. 1. The system 100 may include multiple components 102, and at least one component 102 includes re-usable functions (e.g., common functions shared with multiple applications). Here, the system 100 includes two components 102: a Capital Management Component 102a, including minimum features, and a Reuseable service component 102b. The Reusable service component 102b includes the common functions 104 of "invoice" and "pay". Each common function is shared with two application-specific features. Here, a first application-specific feature is "Pay as Authorization" 106a and a second application-specific feature is "Pay as Red Package" 106b. In this non-exhaustive example, initially the application would create an invoice and a payment would be provided in a way that met the authorization aspect ("Pay as Authorization"). Then, another manner of paying was created—the "Pay as Red Package". Since both features are related to payment (e.g., paying in different manners), the developer may use the same component with a small modification. The developers may write some switch statements (e.g., a selection statement that lets you transfer control to different statements within the switch body depending on the value of the switch expression) within these components to meet the differences. As the organization grows and/or changes, there may be less common functions and more different functions. Further, there may be more special differentiations between the two applications for the Reuse services. Continuing with this example, the invoice function may be shared with two application-specific features also-a "Paper Invoice" and a "Digital Invoice". These four functions (Pay as Authorization, Pay as Red Package, Paper Invoice, Digital Invoice) may be combined in different ways. The many combinations may lead to a more complex system with many branches using "if . . . else . . . " statements in the computer code to separate all the logic within each component accounting for each combination. The complexity of the system may make the system slower and more cumbersome. Additionally, the components in legacy systems may be strictly coupled, making it difficult to extend them or split them from each other. Alternatively, if instead of differentiating the components with a lot of branches, developers may rebuild the component, leading to increased costs for any changes.

To address these problems, embodiments provide an extension tool. A procedure describes a sequence of data transformations on data that is passed as input to database tables. The procedure may be composed of different components per the organization needs to execute a given task/objective. As a non-exhaustive example, a task may be to fulfill a product order, and the components included in the procedure may be: issuing an invoice and payment. The technical codes for executing the task may be in the form of standardized components and extensive components. Extensive components are components with extension points providing for extension/change of the function of the component. Embodiments provide for the definition and verification of new features in a low-code way via the extensive components. Pursuant to embodiments, the extension tool provides a flexible growth architecture on top of a legacy system, reducing the cost of innovation. The extension tool may provide for modular management and building block splicing whereby multiple application-specific features may be isolated from each other, as well as the integration and utilization of existing components, allowing for the secondary development and integration of corresponding applications/application programming interfaces (APIs) to speed up the process of application development and application execution. The isolation may provide for faster processing. Isolating the parts may mean that at runtime the system has to analyze less code to execute the function. Additionally, the smaller more isolated component may make it easier to create new extensions for the component and/or integrate the component with a larger component. The extension tool of embodiments provides for a system architecture that is more flexible and lightweight in terms of used resources than conventional systems. The execution tool may be a low-code development platform that supports component and procedure extensibility. The extension tool may provide for users to search procedure pools, component pools and extension pools to see if there are any existing procedures, components, extensions that meet their requirements. If not, these elements cannot be used. However, in a case the elements capture enough of the needed functionality, the extension tool may provide for the inclusion of an extension to the existing component, such that the component is reused, to fulfil the desired functionality. In this way, the newly extended component is a new component that may be added to the pool. Additionally, according to some embodiments separate systems may be used for separate topics, making it easier to assemble the components associated with the system. For example, the financial system may be isolated from the logistics system. All components belonging to financial areas are within that system and isolated from the components for the logistics area. Embodiments may also accelerate the development phase of an application as users may reuse extensions, components and procedures with some modification, instead of creating each element from the beginning.

Figure 2:
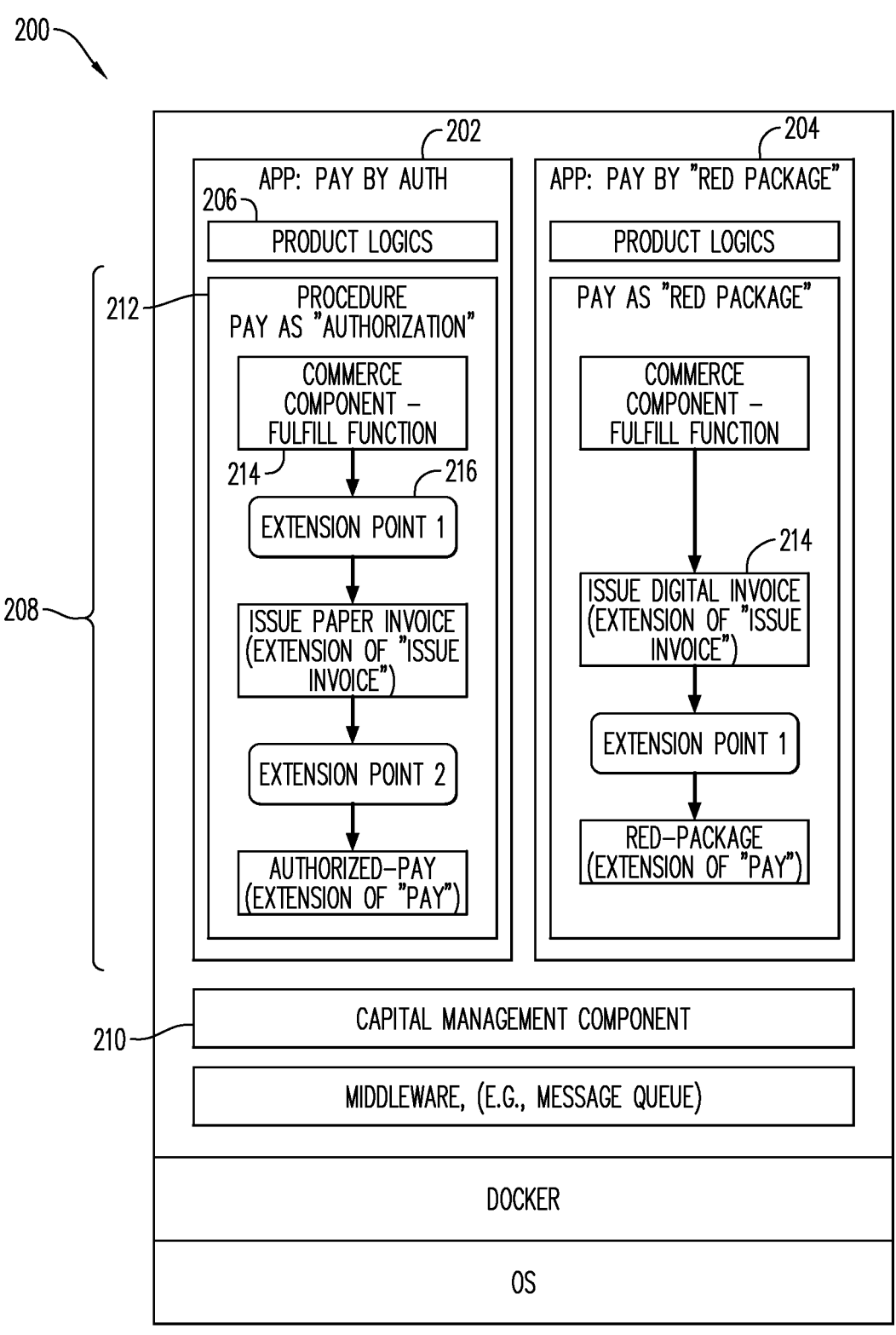
FIG. 2 is a block diagram of a system according to some embodiments.

Pursuant to embodiments, the system 100 shown in FIG. 1 may instead look like the system 200 shown in FIG. 2. Here, each of the Pay as "Auth" feature and the Pay as "Red Package" feature have become isolated from each other in their own individual applications 202, 204, respectively. In this way, the blocks are split into smaller parts that may be grouped in different combinations, making references between system modules clearer and easier to maintain. The smaller parts may also provide for faster processing as compared to conventional components, as described above. The smaller parts may also be more easily validated as less aspects may be checked, and may also have more focused documentation.

Each application includes a product logic layer 206, a procedure layer 208, and a fundamental service layer 210. The procedure layer 208 may include at least one procedure 212. The procedure 212 may include one or more components 214. Each component may include an extension point 216. Pursuant to embodiments, a component may include more than one extension point, and an extension point may have an extension point. The extension point may be a pre-defined location in the code for the component where the component may be modified with additional functions and/or features (e.g., an extension), such that the extension point provides for the component to be reused with some modification (extension). Extension points may be used for extending a standard view of a component with custom content. Herein, the extension is a customization of existing functionality of the components. Extension points may be inserted in a standard view to indicate the position within the view where custom content may be inserted. "Standard view" may refer to a virtual data model allowing direct access to underlying tables of a database. As described further below, the extension point 216 may include a definition as well as provide a sample code representative of code that may be received in the extension point and may be validated. While the same fundamental service layer 210 is shown herein for each application, it is noted that each application may use a different fundamental service layer. As a non-exhaustive example, the Pay by Authorization application may use the Capital Management platform as the fundamental service layer, while the Pay by Red Package application may use a Money Management Platform as the fundamental service layer.

Figure 3A:
FIG. 3A is a block diagram of a system architecture according to some embodiments.
Figure 3B:
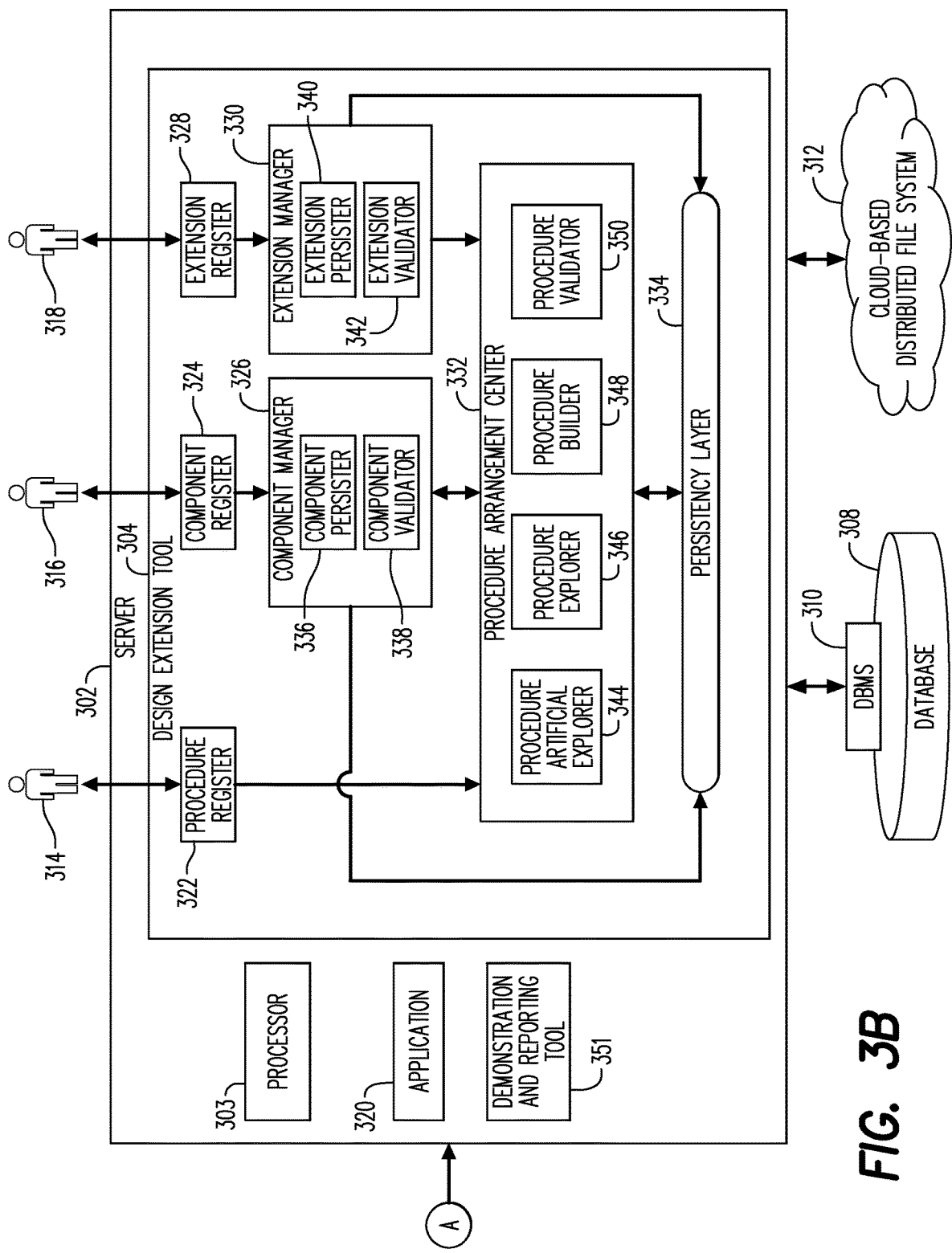
FIG. 3B is a continuation of the block diagram of FIG. 3A according to some embodiments.

FIG. 3 is a block diagram of a system architecture 300 according to some embodiments. The illustrated elements of system architecture 300 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of system architecture 300 are implemented by a single computing device, and/or two or more elements of system architecture 300 are co-located. One or more elements of system architecture 300 may be implemented using cloud-based resources, and/or other systems which apportion computing resources elastically according to demand, need, price, and/or any other metric.

System architecture 300 includes a backend server 302 (including a processor 303), an extension tool 304, an application service 306, databases 308, a database management system (DBMS) 310 and a cloud-based distributed file system 312.

A user may interact with the extension tool 304 as described further below. Non-exhaustive examples of users may be an application developer 314, a component author 316, an extension author 318, or any other suitable user. While in some embodiments, different users may be responsible for specific topics, in other embodiments, a same user may be responsible for multiple topics. At an initial stage, the component author 316 may create reuse (extensive) components with certain generalities for a use case of a given topic (e.g., the payment component and the invoice component of the financial system). At a later stage, the component author 316 may register new components according to their needs. As used herein, a "reuse component" may refer to a component including one or more extension points, such that the component may be modified/reused to suit a given need. The extension author 318 may be part of a central maintenance team of the area (e.g., finance or logistics), part of a specific application development team, or may be from another suitable area. The extension author 318 may modify (reuse) existing components to suit their needs/needs of their area. Often, for a new use case, combining existing components may not meet the requirements of the given case. However, extending a particular component may meet the requirements. The extension author 318 may provide his own implementation based on the extension point of the corresponding component. The form of the extension may include, but is not limited to, writing dynamic scripts, implementing function extension and inheritance, and overwriting non-final cases. It is noted that each extension may have its own extension. The application developer 314 may be responsible for writing a specific application, and may need to weigh the impact of existing components in related topics and their extensions on their organization. The arrangement and combination of the components and their extensions may impact the execution of the tasks. As used herein, the "procedure" may refer to the arrangement and combination of two or more components and their extensions.

The user may interact with the extension tool 304 via a user interface (e.g., graphical user interface (GUI)). The backend server 302 may provide any suitable interfaces through which users may communicate with the extension tool 304 or application 320 executing thereon. The user interface may be presented via at least one of a user interface program, a user interface server, another system or any other suitable device executing program code of a software application for presenting user interfaces. Presentation of the user interface may comprise any degree or type of rendering, depending on the type of user interface code generated by the application 320. For example, the backend server 302 may execute a Web Browser request and receive a Web page (e.g., in HTML format) via HTTP, HTTPS and/or WebSocket, from an application 320 to provide the UI, and may render and present the Web page according to known protocols. Alternatively, user interfaces may be presented by executing a standalone executable file (e.g., an .exe file) or code (e.g., a JAVA applet) within a virtual machine.

The backend server 302 may include one or more applications 320. Application 320 may comprise server-side executable program code (e.g., compiled code, scripts, etc.) executing within the backend server 302 to receive queries/requests from users and provide results to users based on the data of database 308 and cloud-based distributed file system 312, and the output of the extension tool 304. As will be described further below, application 320 may comprise web applications which execute to provide desired functionality.

The extension tool 304 may access data in the database 308 and the cloud-based distributed file system 312 and deploy the data thereto so that the data is provided at runtime. While discussed further below, the database 308 may store data representing procedures, components, extensions and other suitable data. Database 308 (and other databases herein) represents any suitable combination of volatile (e.g., Random Access Memory) and non-volatile (e.g., fixed disk) memory used by the system to store the data.

One or more applications 320 executing on backend server 302 may communicate with DBMS 310 using database management interfaces such as, but not limited to, Open Database Connectivity (ODBC) and Java Database Connectivity (JDBC) interfaces. These types of applications 320 may use Structured Query Language (SQL) to manage and query data stored in database 308 (and other databases described here).

DBMS 310 serves requests to store, retrieve and/or modify data of database 308, and also performs administrative and management functions. Such functions may include snapshot and backup management, indexing, optimization, garbage collection, and/or any other database functions that are or become known. DBMS 310 may also provide application logic, such as database procedures and/or calculations, according to some embodiments. This application logic may comprise scripts, functional libraries and/or compiled program code. DBMS 310 may comprise any query-responsive database system that is or becomes known, including but not limited to a structured-query language (i.e., SQL) relational database management system.

Database 308 (and other databases described herein) may comprise any query-responsive data source or sources that are or become known, including but not limited to a structured-query language (SQL) relational database management system. Database 308 (and other databases described herein) may comprise a relational database, a multi-dimensional database, an extensible Markup Language (XML) document, or any other data storage system storing structured and/or unstructured data. The data of database 308 (and other databases described herein) may be distributed among several relational databases, dimensional databases, and/or other data sources. Embodiments are not limited to any number or types of data sources.

The extension tool 304 may include a procedure register 322, a component register 324, a component manager 326, an extension register 328, an extension manager 330, a procedure arrangement center 332 and a persistency layer 334. The component manager 326 may include a component persister 336 and component validator 338. The extension manager 330 may include an extension persister 340 and an extension validator 342. The procedure arrangement center 332 includes a procedure artificial exporter 344, a procedure explorer 346, a procedure builder 348 and a procedure validator 350.

As described further below, using the extension tool 304, component authors 316 responsible for underlying components may quickly register the components they develop and register possible extension points as well as extensions. The application developer 314 may use the extension tool 304 to search and visually see the functions of given components and their respective implemented extensions. The application developer 314 may then integrate different components (e.g., build a procedure) to address their organizational needs. A user may also define extension points for secondary development in appropriate places within a component, and then register this component, build a procedure with the component and register the built procedure for reference and use by other users. In this way, application developers 314 may quickly build applications for use by an end user and others.

The procedure register 322 may display existing registered procedures in response to input via the procedure explorer 346 and may enable a user to identify whether a procedure with similar function exists, and to select such a procedure and/or create a new procedure. The process of building a new procedure may include selecting components and extensions via the procedure builder 348, as well as arranging the runtime sequence of the selected components and extensions and defining any further extension points. The procedure validator 350 may display this procedure in a visual way, e.g., a "Procedure Preview" for validation by the user. The displayed procedure may provide a visual simulation of task execution. Procedure validator 350 may also check whether the procedure is unique compared with existing procedures, whether the documents are provided and are completed, whether there is a well-defined extension point, whether all necessary codes are provided, and whether input codes are valid (e.g., no syntax errors, no endless loops, etc.). The procedure validator 350 may check other suitable parameters to determine whether the procedure is valid or invalid. After validation, the procedure artificial exporter 344 may export a binary artificial of the procedure to be used by the application. As used herein, "artificial" may refer to the runtime objects for the component. The component may be registered in the system in a binary format and may be referred to as a "binary artificial" 352 (e.g., runtime object in binary format), the binary format may allow the component to be recognized and understood by the system at runtime. Other suitable formats may be used. The runtime object may be an application specific object that contains both state and behavior that provides an application specific function. The binary artificial 352 may be stored in an artificial repository 354. The artificial repository 354 may be a cloud storage or other suitable storage.

The component register 324 may display existing registered components in response to input and may enable a user to identify whether a component with similar functions exists, and to select such a component and/or create a new component. The component register 324 may forward the new component to the component validator 338 of the component manager 326. The component validator 338 may validate the one or more components by executing at least one of a static code scan, running unit tests (with code coverage), checking for inconsistency codes and checking for missing document details. The document details may explain the functionality provided by the components, the problem solved by the component, how the problem is solved by the component, the types of combinations that may be made with the components, and other suitable information. In a case the component is successfully validated (e.g., passes validation), the component may be stored in the persistency layer 334 via component persister 336 of the component manager 326.

The extension register 328 may display existing registered extensions of a given component in response to input and may enable a user to identify whether an extensive component with similar functions exists, and to select such a component and/or create a new extension for the component. The extension register 328 may forward the new extension to the extension validator 342 of the extension manager 330. The extension validator 342 may validate the extension by executing at least one of a static code scan, running unit tests (with code coverage), checking for inconsistency codes and checking for missing document details. As above, the document details may explain the functionality provided by the extensions, the problem solved by the extension, how the problem is solved by the extension, the types of combinations that may be made with the extensions, and other suitable information. In a case the extension is successfully validated (e.g., passes validation), the component may be stored in the persistency layer 334 via component persister 340 of the extension manager 330.

After registration, an end user may execute the application using the procedures and/or components, as provided by the application service 306, via an Application User Interface (API) 356. An internal service 358 of the application service 306 may receive a request for application execution and provide the binary artificial 352, as retrieved from the artificial repository 354, at runtime of the application for execution thereof.

The backend server 302 may also include a demonstration and reporting tool 351. The demonstration and reporting tool 351 may render complexity analysis reports, available function reports, feature lists, effort estimations, and other suitable metrics and information.

Figure 4:
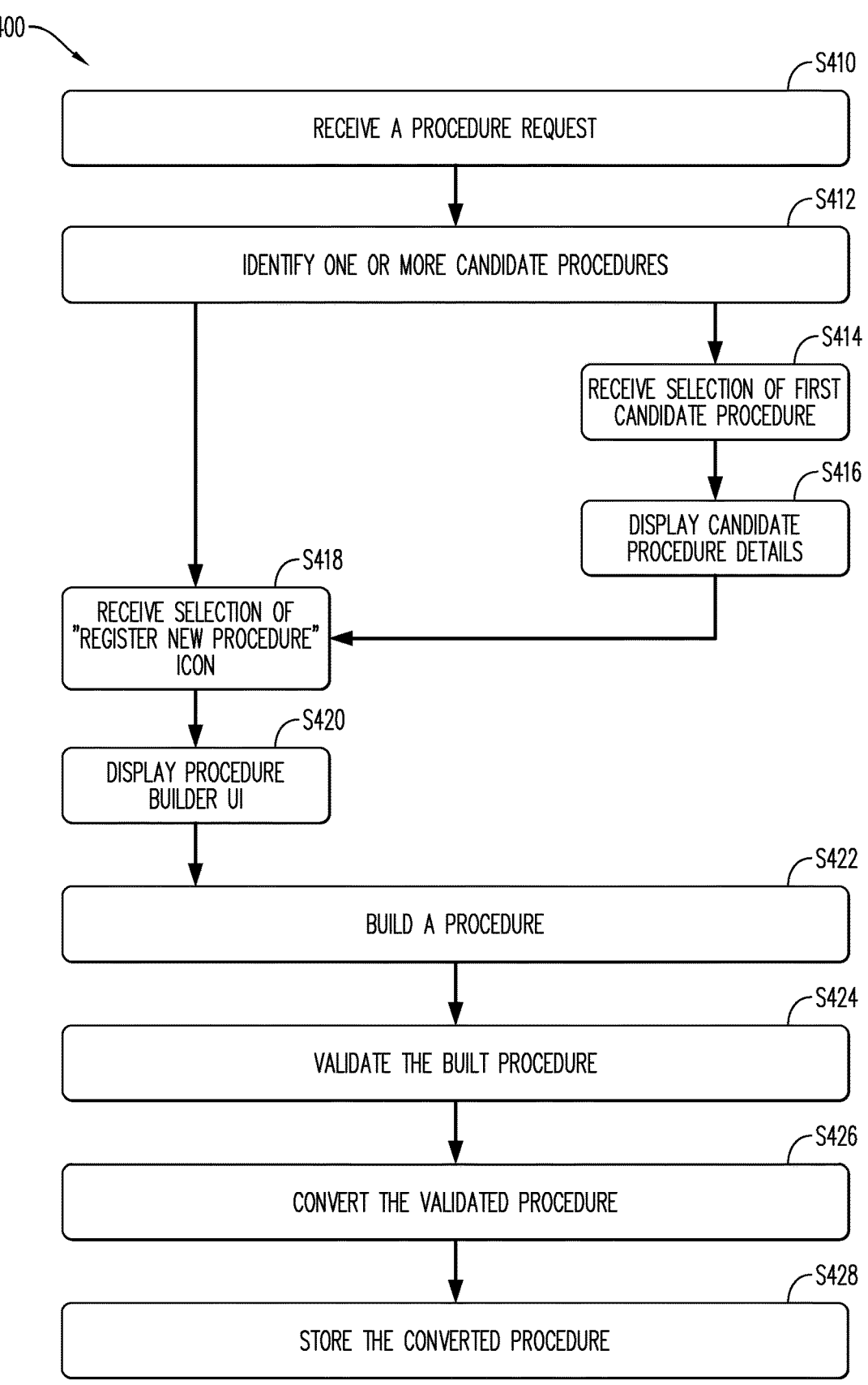
FIG. 4 is a flow diagram according to some embodiments.
Figure 5:
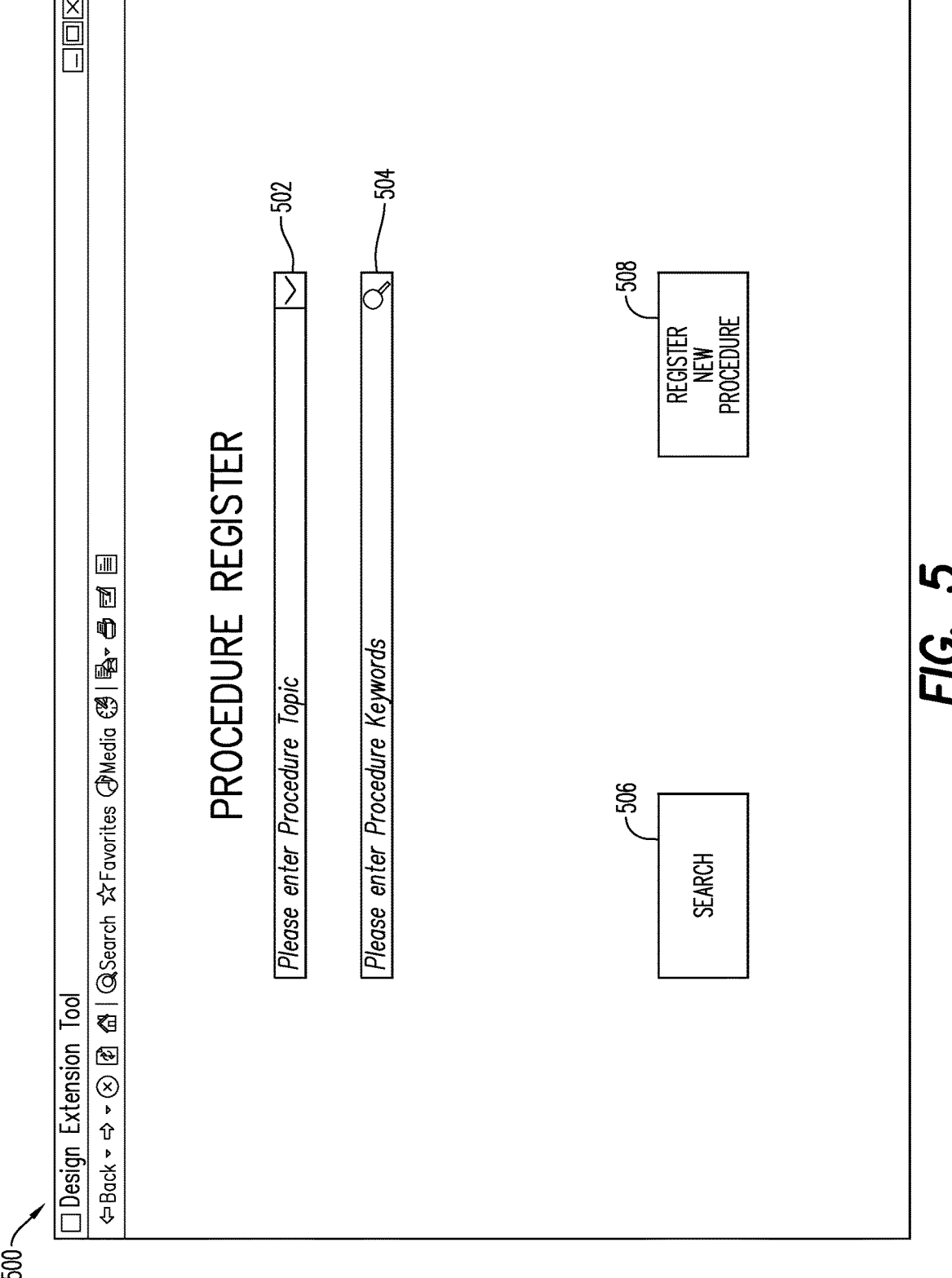
FIG. 5 is a non-exhaustive example of a user interface according to some embodiments.

FIG. 4 illustrates a process 400 for building a procedure in accordance with an example embodiment. The process 400, and other processes described herein, may be performed by a database node, a cloud platform, a server, a computing system (user device), a combination of devices/nodes, or the like, according to some embodiments. In one or more embodiments, the system architecture 300 may be conditioned to perform the process 400, and other processes described herein, such that a processing unit 1735 (FIG. 17) of the system architecture 300 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The process 400 described by FIG. 4 is a high level description, and further details are described below with respect to FIGS. 5-9.

Prior to the process 400, pursuant to some embodiments at least one procedure and/or component may be stored in the persistency layer 334, while pursuant to other embodiments, process 400 may be executed to generate and store an initial procedure and/or component in the persistency layer 334.

Initially, at S410, a procedure request is received. The procedure request may be received from an end user. The procedure request may describe the desired task. The application developer 314 may be presented with a procedure register display 500 (FIG. 5) in accordance with some embodiments. The procedure register display 500 may include a topic field 502 and a search bar field 504. The topic field 502 may be a drop-down menu, a text-entry field, selectable radio buttons, etc. The topic field 502 may at least one of: receive keywords, and display a menu of one or more topics for which a procedure may be available and/or built. As a non-exhaustive example, the term "Finance" may be received in the topic field 502 and/or may be populated on a menu (not shown). One or more keywords describing the procedure may be received in the search field 504. The application developer 314 may input keywords based on the information in the procedure request. Pursuant to some embodiments, values may be received in the search field 504 without receipt of values in the topic field 502. The procedure register display 500 may also include a "Search" icon 506 and a "Register New Procedure" icon 508. In embodiments, receipt of keywords in the topic field 502 and search field 504 may automatically populate values in a menu, while in other embodiments, selection of the "Search" icon may result in population of values. Selection of the "Register New Procedure" icon 508 may result in display of a Procedure Builder user interface 800 (FIG. 8), for registration of a new procedure, as described further below.

In response to received keyword input 602 (FIG. 6), one or more candidate (possible) procedures 604 (FIG. 6) may be identified based on the received keyword input. The candidate procedures 604 may be displayed in a candidate procedure menu 606 of the user interface 600 shown in FIG. 6. Herein, a candidate procedure may be a procedure that is available for selection but has not yet been selected. Pursuant to embodiments, the extension tool 304 may execute a fuzzy search to identify the candidate procedures 604. The fuzzy search may use a fuzzy matching algorithm which returns a list of results based on likely relevance even though search words and spellings may not be an exact match. The fuzzy matching algorithm may identify candidate procedures that approximately match patterns for the received keyword input 602. Here, the keyword input is "Invoice and Pay". It is noted that no topic is received in this non-exhaustive example. In response to execution of the fuzzy search, the candidate procedure menu 606 includes two candidate procedures 604. The candidate procedure menu 606 may include for each candidate procedure 604, a procedure identifier (id) 608, a procedure description 610, and a procedure usage 612. Other suitable procedure parameters may be included in the candidate procedure menu 606. The candidate procedure menu 606 may include one or more filter icons 614 that may be used to filter and/or sort the candidate procedures.

The user may search the candidate procedures to determine whether one of the candidate procedures will meet their requirements. In a case the procedure cannot meet the requirement, in some instances an extension may be added to one of the components to meet the requirement instead of re-arranging components to make a new procedure, or creating an entirely new procedure.

Next, one of selection of the "Register New Procedure" Icon 508 or selection of a first candidate procedure is received per selection of the "Select" Icon 605.

Figure 6:
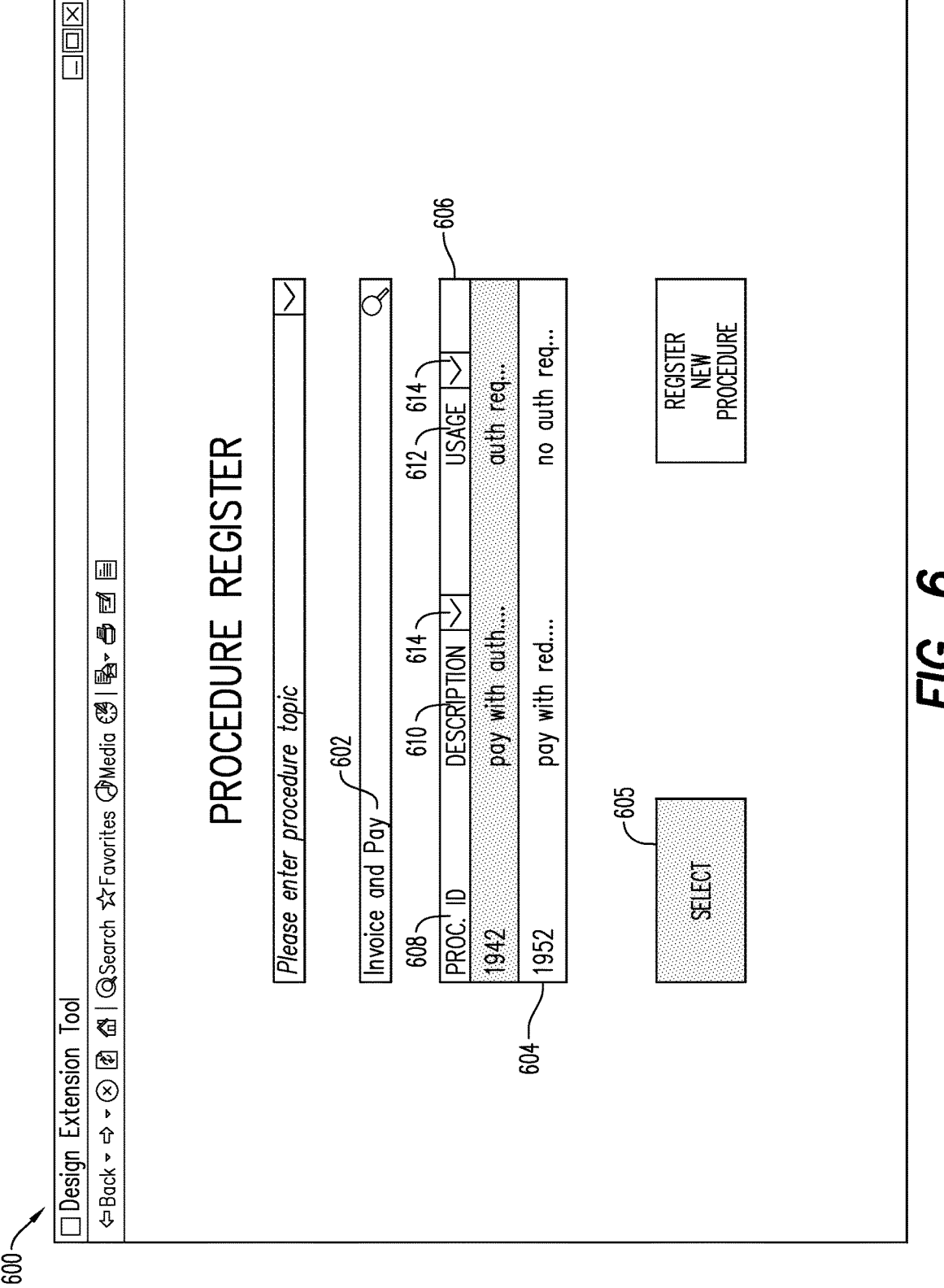
FIG. 6 is a non-exhaustive example of a user interface according to some embodiments.
Figure 7:
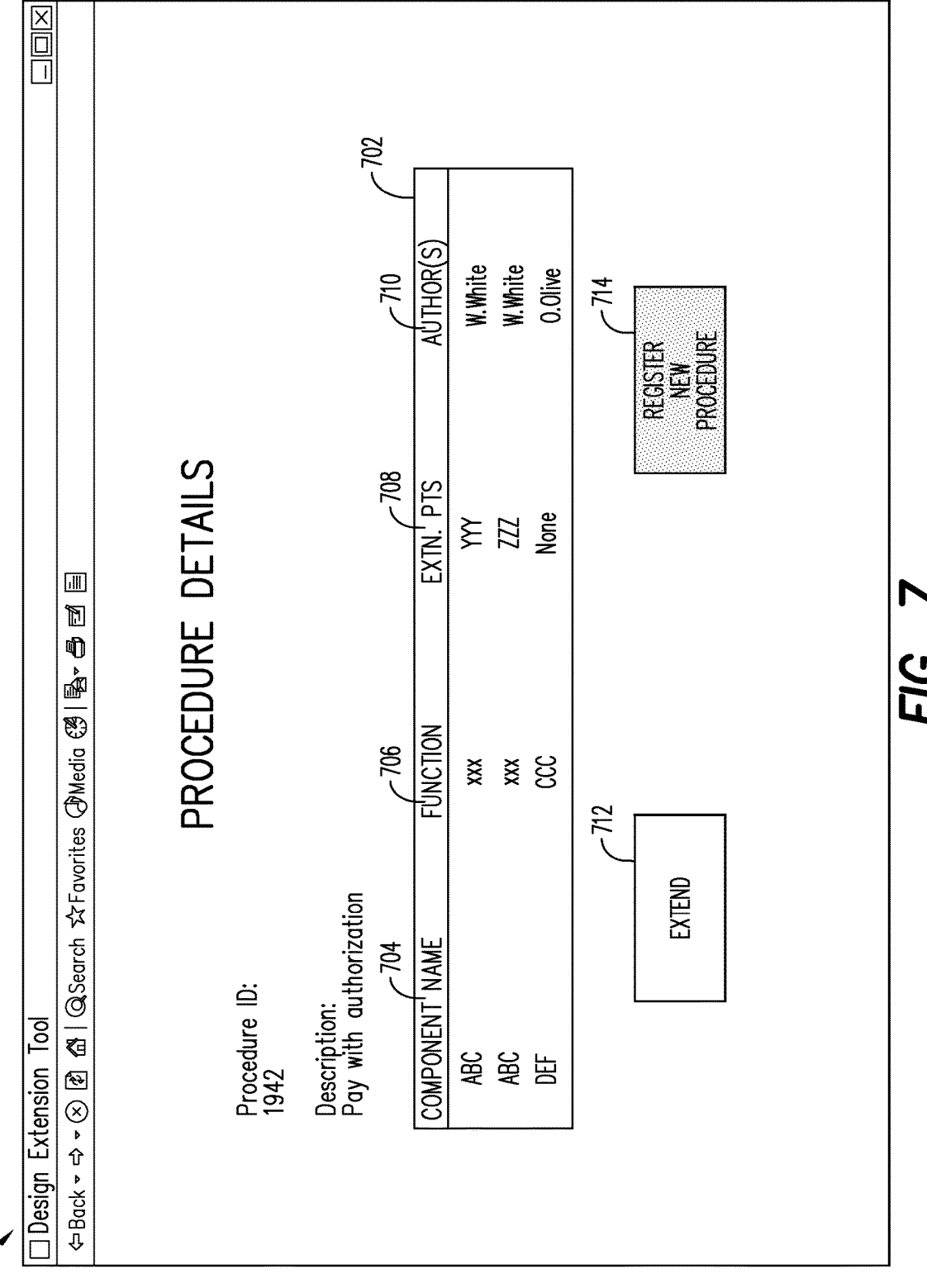
FIG. 7 is a non-exhaustive example of a user interface according to some embodiments.
Figure 8:
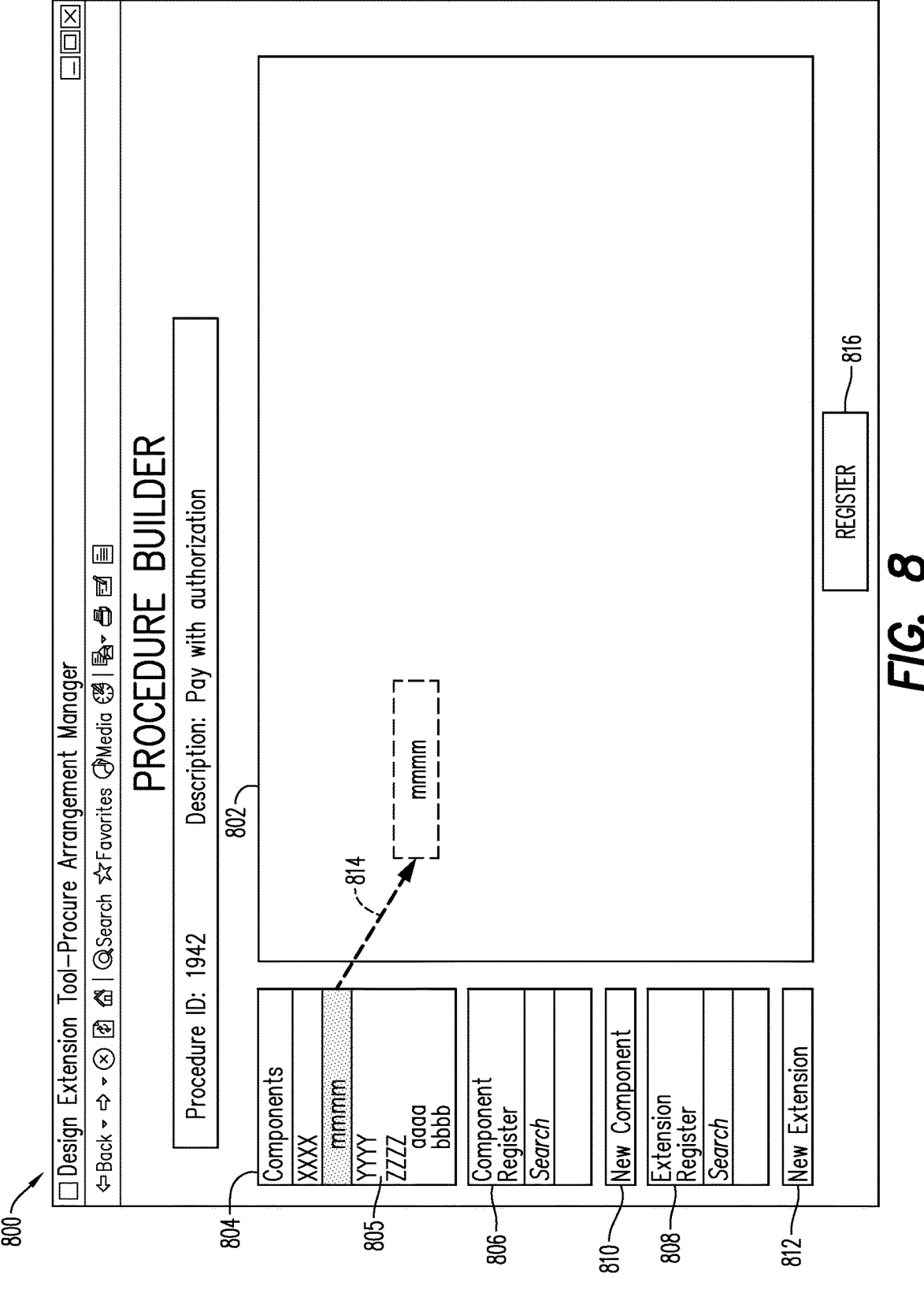
FIG. 8 is a non-exhaustive example of a user interface according to some embodiments.

In S414 selection of a first candidate procedure 604 is received per selection of the "Select" icon 605. The selection is shown in FIG. 6 via the shaded candidate procedure with procedure id 1942, and shading of the "Select" icon 605. Selection of the first candidate procedure 604 may result in the extension tool 304 retrieving procedure details from the persistency layer 334 and displaying the details in a Procedure Details display 700 (FIG. 7) in S416. The Procedure Details display 700 may include, for the selected candidate procedure, a table 702. The table 702 may include a component name 704, function 706, extension points 708 and author(s) 710. The component name 704 may be provided by the author 710. The function 706 describes an operation for the component. The function may be executed with received values for given input parameters to output a result. The extension point 708 describes the current extension points for the component. The extension inserted at the extension point 708 may be a customization (e.g., modification or addition) to the function. Here, the ABC component includes one function (xxx) and two extension points (YYY and ZZZ), while the DEF component includes one function (CCC) and zero extension points (none).

In a case where a procedure is different from the requirement per the request, but the extension point is good enough, the user may reuse the procedure by extending the procedure according to its extension rules. Extension rules may include, but are not limited to, whether the extension parameters are as what is defined in the documents and are stored in a case the procedure is registered. In a case of extension, selection of an "Extend" icon 712 is received. Extending an existing procedure may use the extension point of the existing procedure, and a new procedure extending from an existing procedure may become a new procedure having a relationship (e.g., link/navigation) to the existing procedure. As such, selecting the "Extend" icon 712 may have the effect of receiving selection of the "Register New Procedure" icon per S418, with the addition of the linking relationship. In some embodiments, the "Extend" icon may be unavailable until a component is selected (e.g., via highlighting). After selection of the "Extend" icon, at least one extension is created, received and registered/stored, as described further below. The user may then build a procedure with this newly stored extension via the procedure builder 348, as described further below with respect to FIG. 8, the display of the procedure builder UI in S420 and the actual building in S422. The built procedure may be validated by the procedure validator 350 in S424. The procedure validator 350 may check whether the procedure is unique compared with existing procedures, whether the documents are provided and are completed, whether there is a well-defined extension point, whether all necessary codes are provided, and whether input codes are valid (e.g., no syntax errors, no endless loops, etc.). The procedure validator 350 may check other suitable parameters to determine whether the procedure is valid or invalid. After a determination the procedure is valid, the procedure artificial exporter 344 may convert the procedure to a binary artificial 352 at S426, store the binary artificial in the persistency layer 334 and export the binary artificial to the artificial repository 354 for storage at S428. After storage, the procedure may be identified via a search with the procedure register 322. It is further noted that the user may directly use the exported binary artificial to embed it into its own service implementation.

Turning back to the process 400, selection of the "Register New Procedure" icon may be received directly in S418. Receipt of selection of the "Register New Procedure" icon 508, 714 may be in one of several instances. For example, the "Register New Procedure" icon 508 may be selected after S412 in a case the user wants to create a procedure without searching existing procedures or in a case the displayed procedures do not meet user requirements. The "Register New Procedure" icon 714 may also be selected in a case the available components for the displayed procedure details are unsuitable for the user requirements.

In response to selection of the "Register New Procedure" icon, a Procedure Builder user interface 800 (FIG. 8) is displayed in S420. The Procedure Builder user interface 800 includes a canvas 802, an existing components menu 804 in a case the procedure is being modified. The existing component menu 804 may include existing components 805 for the identified procedure, as well as existing extension points 807 for the respective component. The component and extensions are displayed in a hierarchical manner. Here, component "XXXX" has extension point "mmmm", while component "ZZZZ" has extension point "aaaa" and extension point "bbbb". In a case the procedure is being modified, the value for the procedure ID and the value for the description may be populated. In a case of creation of a new procedure, the Procedure Builder user interface 800 may include a description user-entry field (not shown). The Procedure Builder user interface 800 also includes a Component Register search box 806 and an Extension Register search box 808. The Component Register search box 806 may be an embedded version of the component register 324. The user may search the component register 324 for any registered components via the Component Register search box 806. Selection of a "New Component" icon 810 initiates a component creation process 1000 as described further below with respect to FIG. 10. The Extension Register search box 808 may be an embedded version of the extension register 328. The user may search the extension register 328 for any registered extensions via the Extension Register search box 808. Selection of a "New Extension" icon 812 initiates an extension creation process as described further below. The process 400 continues to S422 and the procedure is built. In one or more embodiments, the procedure is built by receiving information (e.g., components and extensions) on the canvas 802. The information may be at least one of one or more components and one or more extensions. The information may be received by dragging and dropping information on the canvas 802, as shown herein by dotted line 814. As the information is received on the canvas 802, the user may arrange the information in a particular order to be executed at runtime.

Figure 9:
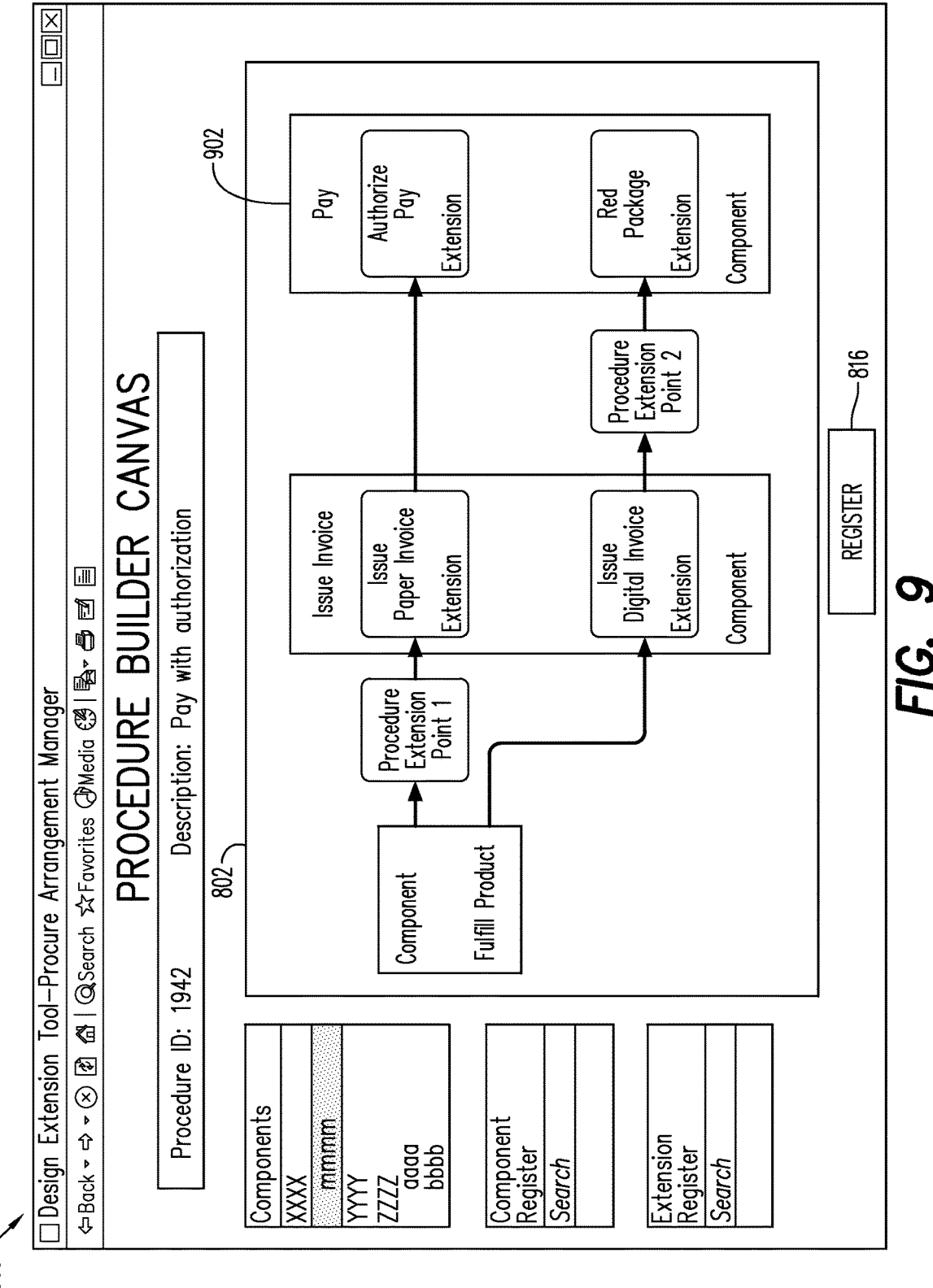
FIG. 9 is a non-exhaustive example of a user interface according to some embodiments.

FIG. 9 is a non-exhaustive example of a procedure 902 built on the canvas 802. Here, the procedure 902 includes three components (Fulfill Product, Issue Invoice and Pay). The procedure 902 includes a first extension point between the Fulfill Product component and a second extension point between the Issue Invoice component and the Pay component. The Issue Invoice component includes two previously registered extensions-Issue Paper Invoice Extension and Issue Digital Invoice Extension. The Pay component also includes two previously registered extensions-Authorized-Pay Extension and Red Package Extension.

Once the procedure is completed, the user may select the "Register" icon 816, and the built procedure may be validated by the procedure validator 350, as described above with respect to S424.

Figure 10:
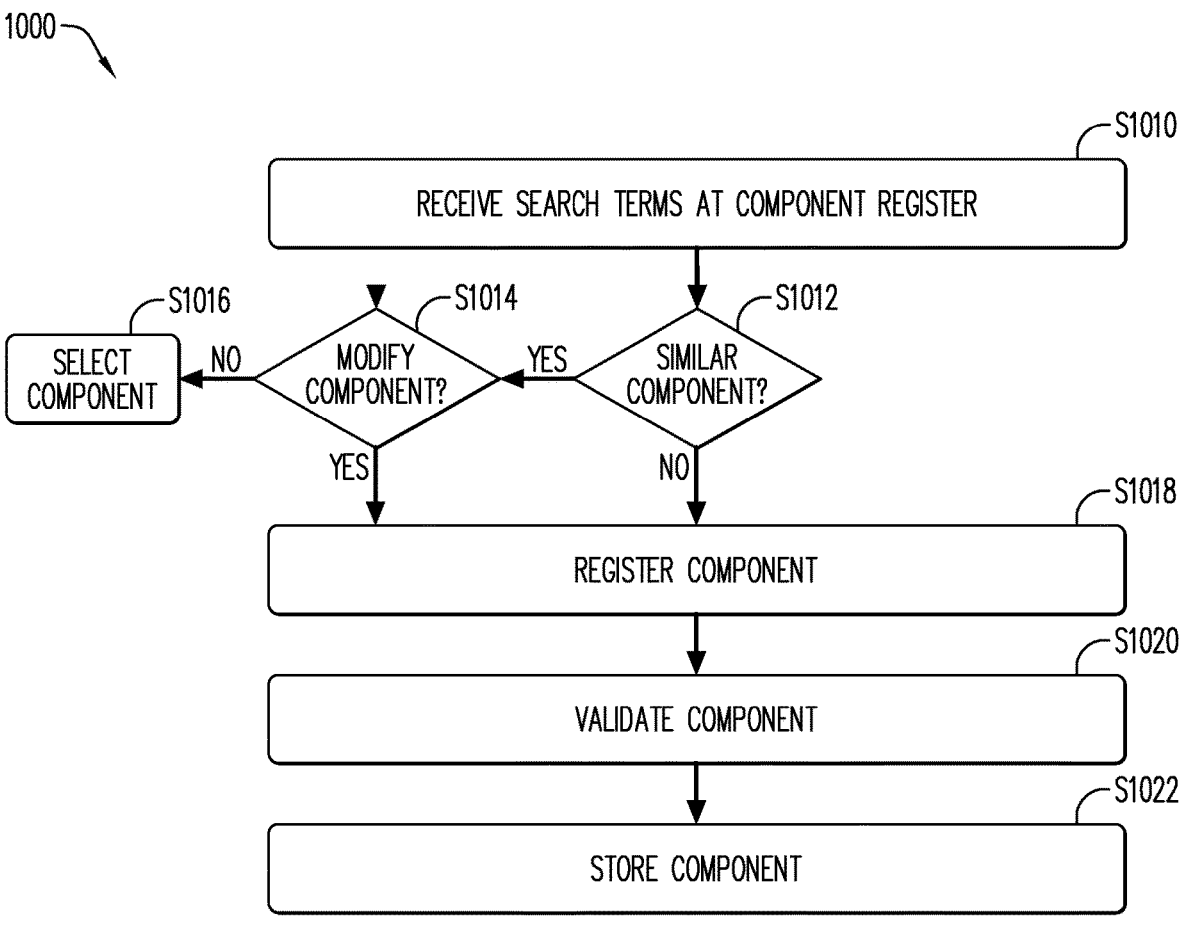
FIG. 10 is a flow diagram according to some embodiments.
Figure 11:
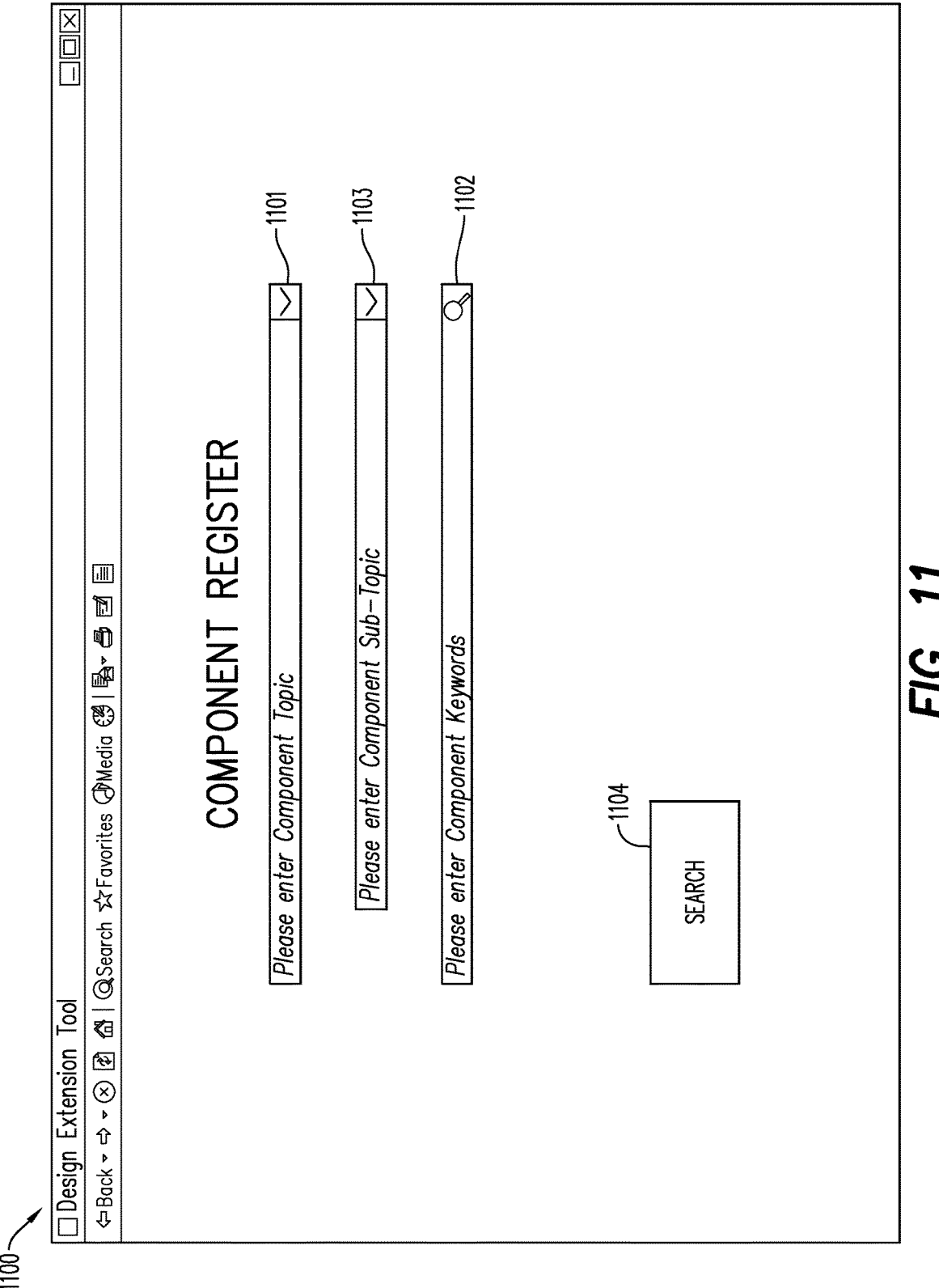
FIG. 11 is non-exhaustive example of a user interface according to some embodiments.

Turning to FIG. 10, a process 1000 for creating a component is provided. The process 1000 may be invoked any time a component is created. Initially, search terms are received at the component register 324 at S1010. The search terms may be received at the component register embedded in the Procedure Builder user interface 800 or in a separate Component Register UI 1100 (FIG. 11). Pursuant to some embodiments, the component register may include a topic field search bar 1101 to further focus the search. It is noted the components may be separated by topic. For example, components belonging to financial areas are isolated from components belonging to logistics areas.

As described above with respect to the procedure register, the topic field search bar 1101 on the component register may be a drop-down menu, a text-entry field, selectable radio buttons, etc. The topic field search bar 1101 may at least one of receive keywords, and display a menu of one or more topics for which a component may be available and/or built. As a non-exhaustive example, the term "Finance" may be received in the topic field search bar 1101 and/or may be populated on a menu (not shown). In some embodiments, the topic field may have a sub-topic field 1103.

The search terms may be received in a component search box 1102. After entry in the component search box 1102 or after selection of a "Search" icon 1104, the extension tool 304 may execute a fuzzy search to identify the candidate components. The fuzzy search may use a fuzzy matching algorithm which returns a list of results based on likely relevance even though search words and spellings may not be an exact match. The fuzzy matching algorithm may identify candidate components that approximately match patterns for the received keyword input for a function by comparing component descriptions. In S1012 it is determined whether the candidate components are similar to what is needed with respect to the function provided by the component. It is noted that in some cases, zero candidate components are identified. In a case of zero identified candidate components, the process proceeds to S1018, as described further below.

Figure 12:
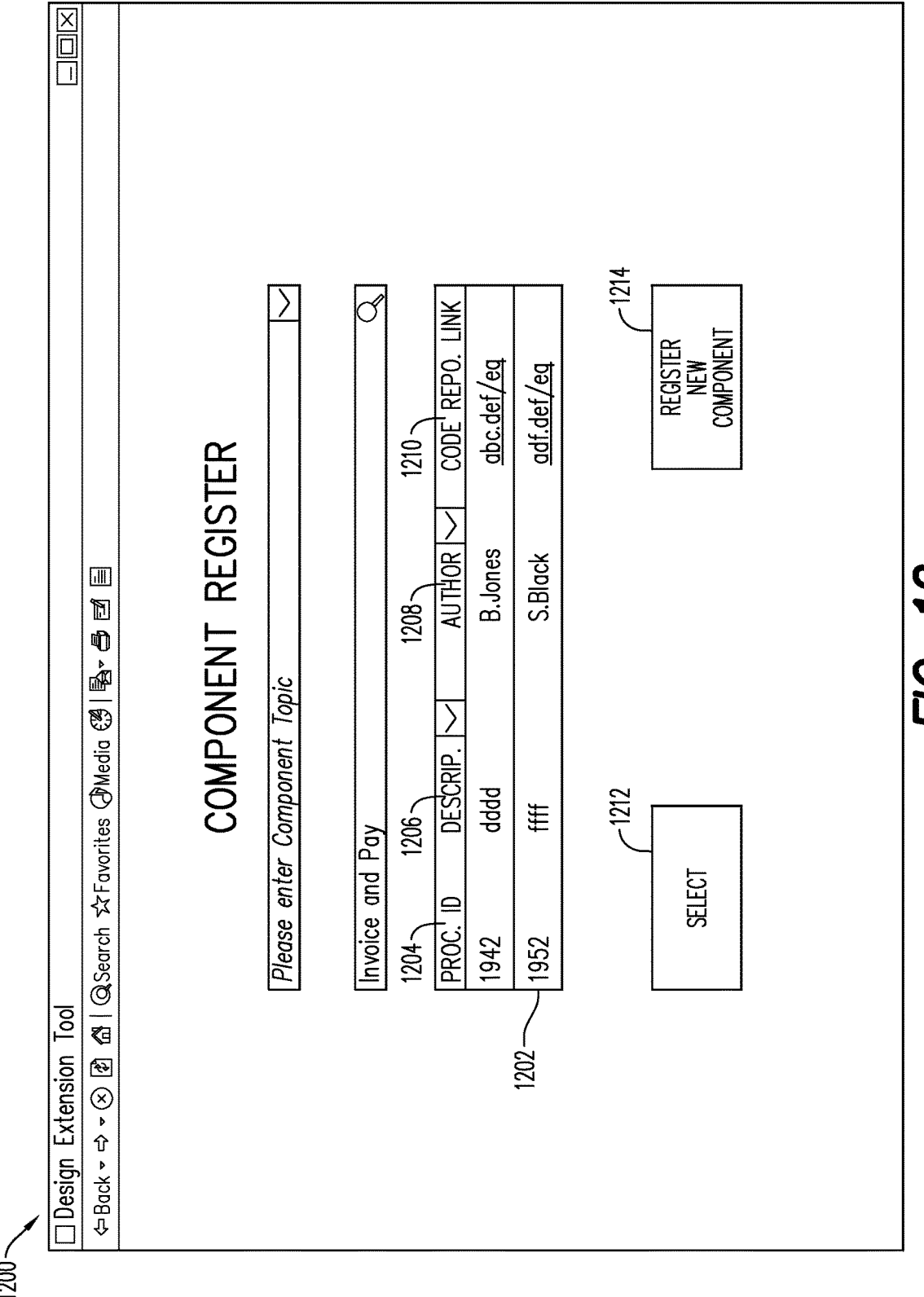
FIG. 12 is a non-exhaustive example of a user interface according to some embodiments.
Figure 13:
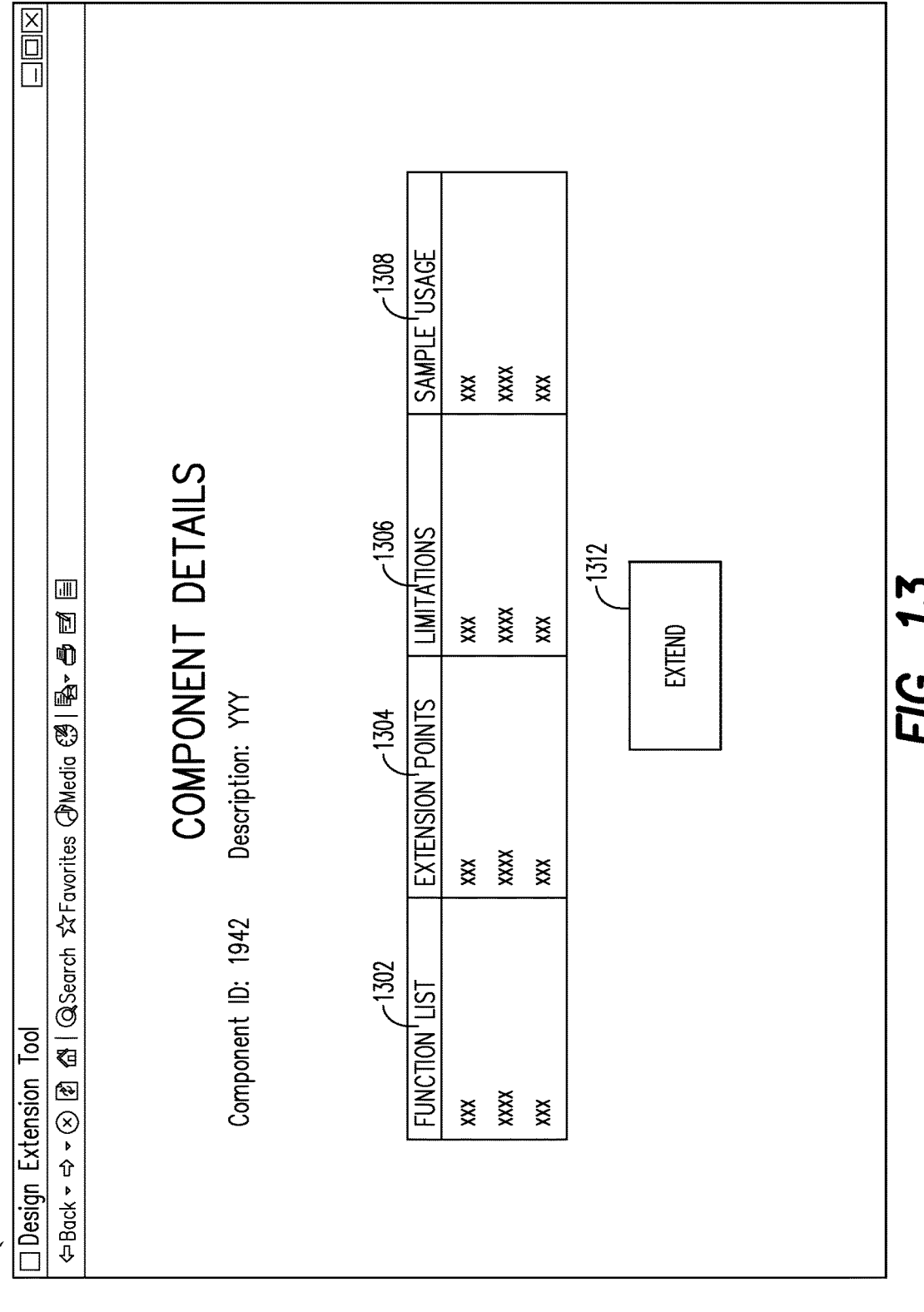
FIG. 13 is a non-exhaustive example of a user interface according to some embodiments.

The Candidate Component User Interface 1200 of FIG. 12 may include a list 1202 of candidate components. The list may include for each component, a component identifier 1204, a component description 1206, author 1208 and code repository link 1210. As described above, the parameters in the list may be filtered and/or sorted. In a case the user is interested in further details for a specific component, the user may select the component via selection of the "select" icon 1212, which will bring the user to a Component Details User Interface 1300 (FIG. 13). The Component Details User Interface 1300 may include for the selected component, a function list 1302, extension points 1304, limitations (e.g., rules) 1306 and sample usage code 1308.

In a case it is determined at S1012 that there is at least one candidate component that satisfies the needs, the process proceeds to S1014 and it is determined whether the candidate component needs to be modified to better suit the objective. This modification of the component is a reuse of the component. In a case the candidate component does not need to be modified, the process proceeds to S1016, and the candidate component is selected for registration and/or inclusion in a procedure.

In a case the component does need to be modified per S1014 or in a case the component is dissimilar per S1012, the process proceeds to S1018 and a new component is registered. The new component may be registered in response to selection of a "Register New Component" icon 1214. The user may build a new component by entering component information into one or more user-entry fields (not shown). Component information may include, but is not limited to, function, how the extension points can be used, limitations (e.g., rules), etc. The component manager 326 may provide a code repository link for this component, and the user may then enter the code for this component. The component may be added in the form of a Binary Artificial. The component may provide one or more extension points. The extensions may include, but are not limited to, dynamic scripts, function extensions, non-final classes and format documentation. The extension may be documented in a system-traceable manner via inversion, whereby documents are retrieved containing a specific term or words, as there may be a list of documents containing the specific term or word.

Figure 14:
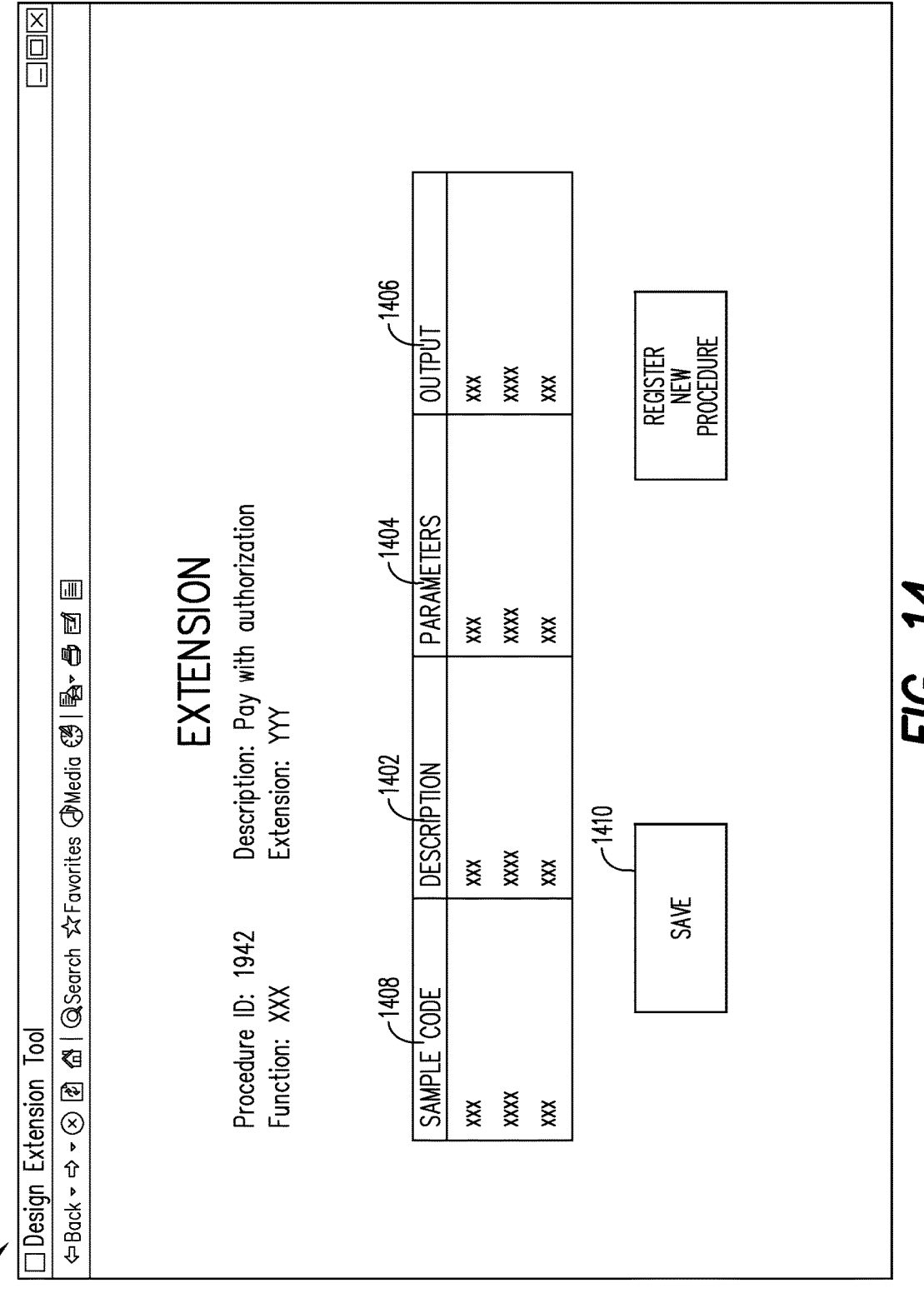
FIG. 14 is a non-exhaustive example of a user interface according to some embodiments.

Pursuant to embodiments, the Component Details User Interface 1300 may include an "Extend" icon 1312. Selection of the "Extend" icon may allow a user to add an extension for the component. Consider the scenario where a user reviews the list of candidate components and there are no components exactly matching the user's requirements. However, the user finds one component that closely matches his requirement and observes the extension points 1304 for that component may be extended to meet his requirements. Selection of the "Extend" icon 1312 may result in an Extension User Interface 1400 (FIG. 14). In some embodiments a software wizard may prompt the user to enter extension details for the extension point. The extension details may include, but are not limited to, descriptions, 1402, parameters 1404, and output 1406. The Extension User Interface 1400 may also include a sample code 1408 for this extension, and the user may enter the new code for the new extension. The user may select the "Save" icon 1410 to enter the new code for the extension. After entering the new code for the extension, the user may document the differences between this extension and any previously registered extensions for this component.

Responsive to selection of the "Save" Icon, the component is validated via the component validator 338 in S1020. The component validator 338 may check the quality of the binary artificial of the component via at least one of a static code scan, running of a unit test and a static document scan. The component validator 338 may check the quality of the binary artificial via other processes. In a case the component validator 338 determines the quality of the binary artificial for a given component is valid (e.g., acceptable), the component is entered into the system and stored in the component persister 336 and the persistency layer 334 in S1022. After validation, the newly extended component may be linked to the original component.

As described above, a component may have multiple extensions corresponding to it. Each extension may include a clearly recorded purpose and extended functions. As described for the component, a user may search—using the fuzzy algorithm—for an already existing extension that meets their objective. If the extension does not exist, the user (e.g., extension author 318) may create a new extension based on the extension point of the corresponding component. The form of the extension may include, but is not limited to, writing dynamic scripts, implementing function extension and inheritance and overwriting non-final classes. It is further noted that each extension may have one or more extensions.

Figure 15:
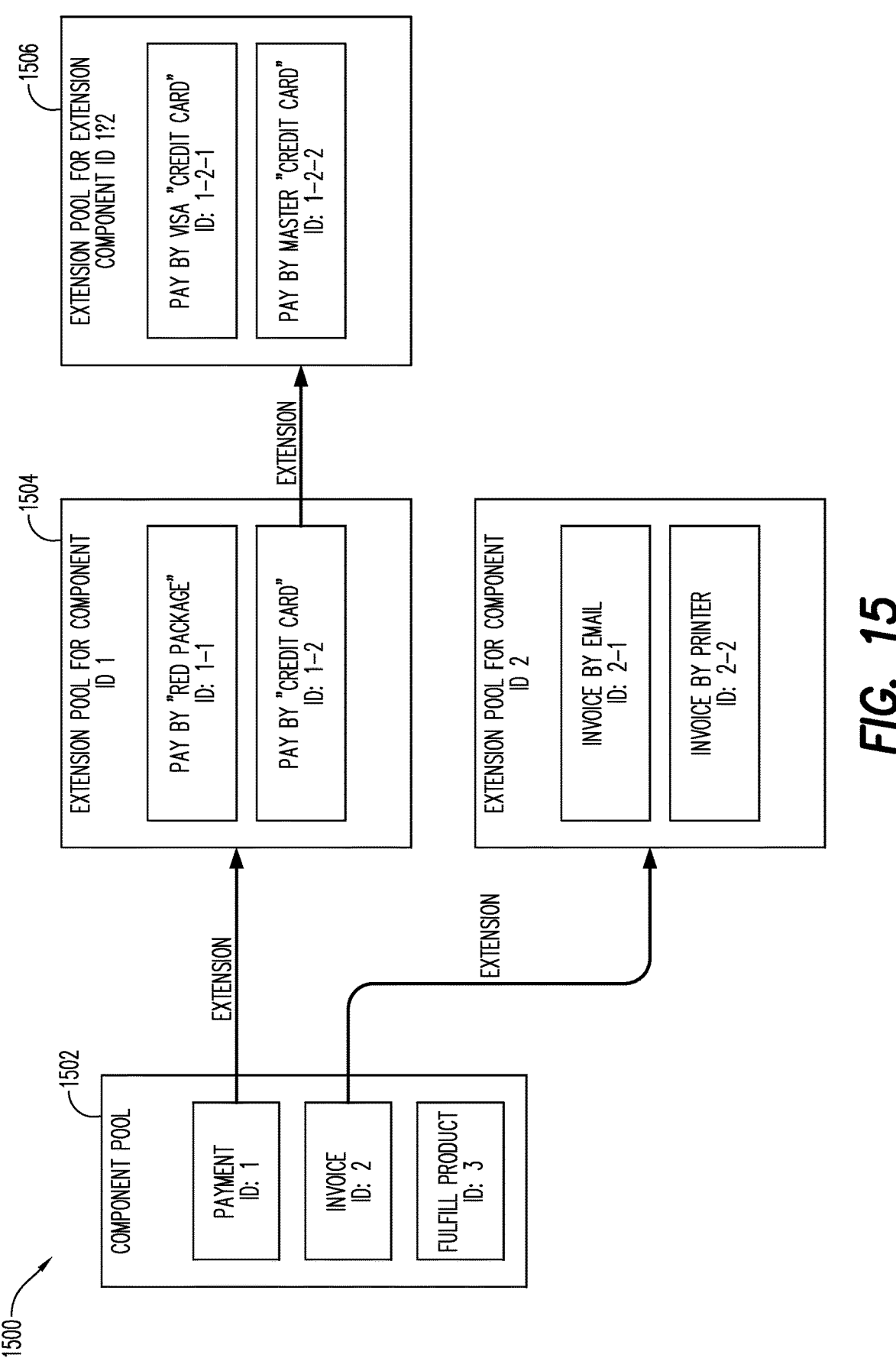
FIG. 15 is a block diagram of a non-exhaustive example of a component hierarchy according to some embodiments.

As a non-exhaustive example, FIG. 15 includes a component hierarchy 1500. The component hierarchy 1500 includes a component pool 1502 include three components (Payment, Invoice and Fulfill Product). Here, the Payment Component has an extension pool 1504 including two extensions (Pay by "Red Package" and Pay by "Credit Card"). Further, the Pay by "Credit Card" extension has its own extension (sub-extension) pool 1506 with two extensions (Pay by VISA "Credit Card" and Pay by MASTER "Credit Card"). The Invoice component has one extension pool with two extensions (Invoice by email and Invoice by Printer) and the Fulfill Product component has zero extensions.

Figure 16:
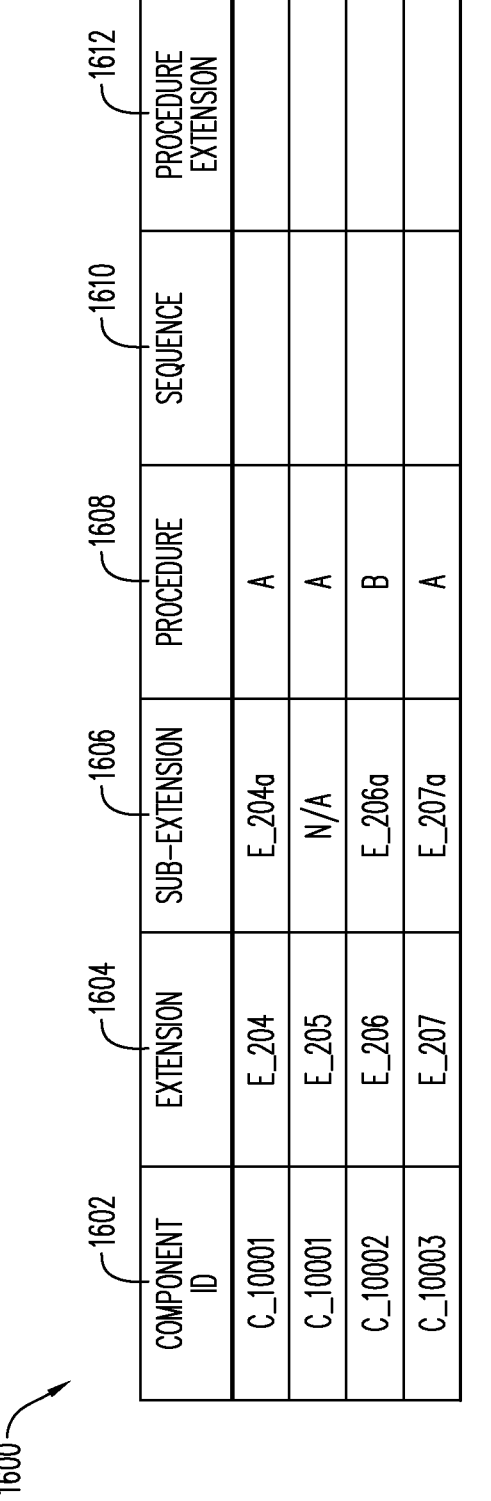
FIG. 16 is a non-exhaustive example of a table according to some embodiments.

Referring to FIG. 16, a table is shown that represents the component database 1600 according to some embodiments. The table may include, for example, entries associated with different components. The table may define fields 1602, 1604, 1606, 1608, 1610, 1612 for each of the entries. The fields 1602, 1604, 1606, 1608, 1610, 1612 may, according to some embodiments, specify: a component identifier 1602, an extension 1604, a sub-extension 1606a procedure 1608, a sequence 1610 and a procedure extension 1612. The component database 1600 may be created and updated, for example, based on information electrically received from the extension tool 304 or other suitable systems.

The component identifier 1602 may be, for example, a unique alphanumeric code identifying a particular component. The extension 1604 may identify the extension mapped to the component. The sub-extension 1606 may identify an extension mapped to the extension. The procedure 1608 may identify the procedure that use the components. The sequence 1610 may illustrate the sequence of extended components. The procedure extension 1612 may illustrate the procedure's extension. Pursuant to embodiments, when a "Procedure Extension" is set, the "Component ID" may be empty because the "procedure extension" may be between components.

Figure 17:
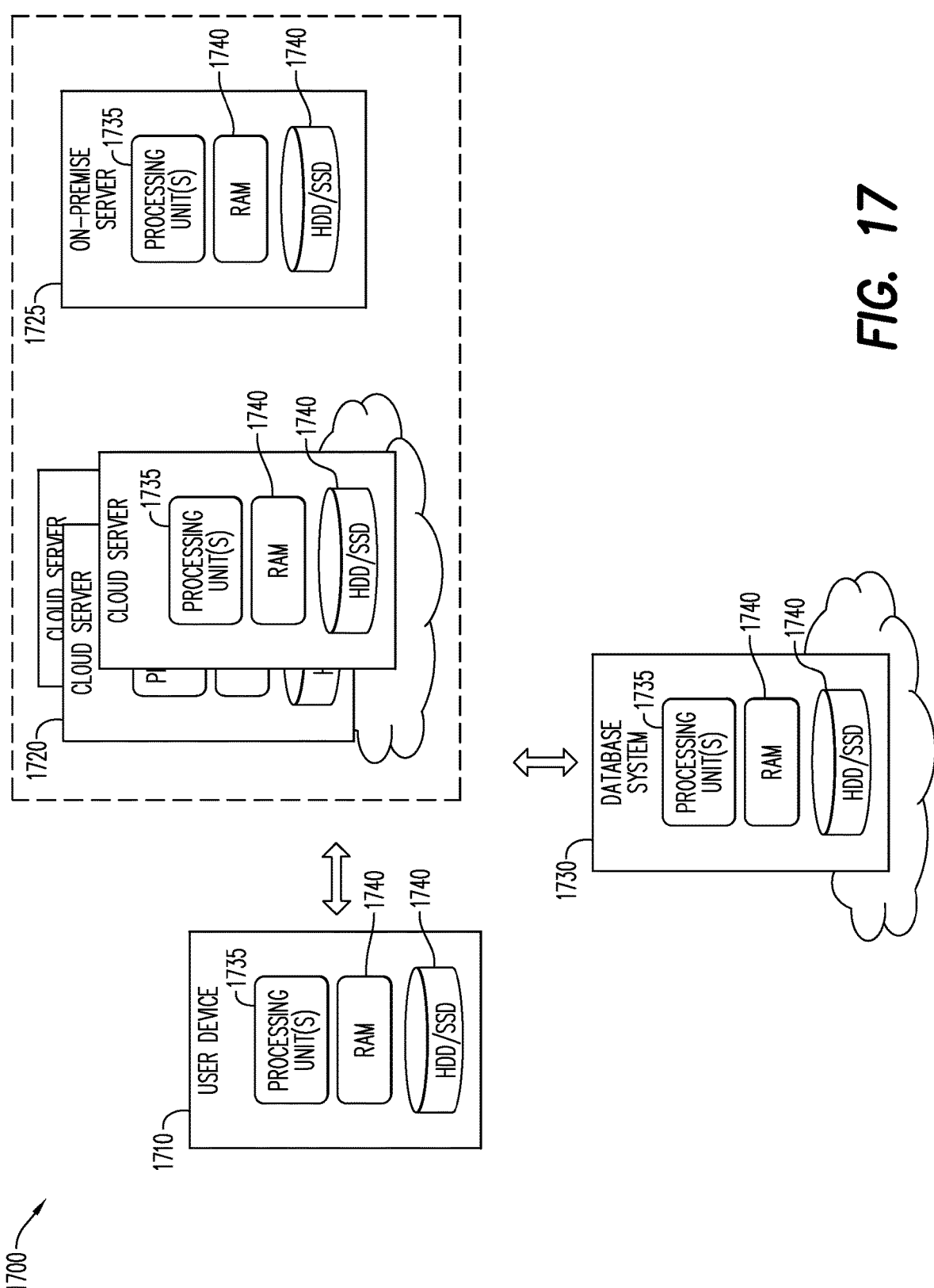
FIG. 17 is a block diagram of a deployment architecture according to some embodiments.

FIG. 17 illustrates a cloud-based database deployment 1700 according to some embodiments. The illustrated components may reside in one or more public clouds providing self-service and immediate provisioning, autoscaling, security, compliance and identity management features.

User device 1710 may interact with applications executing on one of the cloud application server 1720 or the on-premise application server 1725, for example via a Web Browser executing on user device 1710, in order to create, read, update and delete data managed by database system 1730. Database system 1730 may store data as described herein and may execute processes as described herein to cause the execution of the extension tool 304 for use with the user device 1710. Cloud application server 1720 and database system 1730 may comprise cloud-based compute resources, such as virtual machines, allocated by a public cloud provider. As such, cloud application server 1720 and database system 1730 may be subjected to demand-based resource elasticity. Each of the user device 1710, cloud server 1720, on-premise application server 1725, and database system 1730 may include a processing unit 1735 that may include one or more processing devices each including one or more processing cores. In some examples, the processing unit 1735 is a multicore processor or a plurality of multicore processors. Also, the processing unit 1735 may be fixed or it may be reconfigurable. The processing unit 1735 may control the components of any of the user device 1710, cloud server 1720, on-premise application server 1725, and database system 1730. The storage devices 1740 may not be limited to a particular storage device and may include any known memory device such as RAM, ROM, hard disk, and the like, and may or may not be included within a database system, a cloud environment, a web server or the like. The storage device 1740 may store software modules or other instructions/executable code which can be executed by the processing unit 1735 to perform the method shown in FIGS. 4/10. According to various embodiments, the storage device 1740 may include a data store having a plurality of tables, records, partitions and sub-partitions. The storage device 1740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
   a memory storing processor-executable program code; and
   a processing unit to execute the processor-executable program code to cause the system to:
      receive a request for a procedure, the procedure including two or more components;
      identify one or more possible procedures based on the request;
      build the procedure based on the identified one or more possible procedures, wherein building the procedure includes adding extension code to a first component of the first possible procedure at an extension point of the first component to modify the first possible procedure and output a reuse component, wherein the extension point is a pre-defined location in a standard view virtual data model of the component;
      validate the reuse component in the built procedure;
      convert the validated reuse component to a binary artificial, wherein the binary artificial is a runtime object in a binary format; and
      store the binary artificial in a persistency layer.

2. The system of claim 1, further comprising processor-executable program code to cause the system to:
   validate, via an extension validator, the added extension code prior to conversion.

3. The system of claim 2, wherein the validation is via at least one of a static code scan, a unit test, a static documentation scan and a check of inconsistency codes.

4. The system of claim 1, wherein none of the possible procedures are selected in a case the possible procedures are unsuitable for user requirements.

5. The system of claim 4, wherein the built procedure is a new procedure.

6. The system of claim 1, wherein the one or more possible procedures are identified by fuzzy logic.

7. The system of claim 1, wherein the one or more possible procedures include for each component of the procedure: a function, one or more extension points, limitations and sample usage codes.

8. The system of claim 1, wherein the added extension is added to a first component of the two or more components of the possible procedure.

9. A computer-implemented method comprising:
   receiving a request for a procedure, the procedure including two or more components;
   identifying one or more possible procedures based on the request;
   building a procedure based on the identified one or more possible procedures, wherein building the procedure includes adding extension code to a first component of the first possible procedure at an extension point of the first component to modify the first possible procedure and output a reuse component, wherein the extension point is a pre-defined location in a standard view virtual data model of the component;
   validating the reuse component in the built procedure;
   converting the validated reuse component to a binary artificial, wherein the binary artificial is a runtime object in a binary format; and
   storing the binary artificial in a persistency layer.

10. The method of claim 9, wherein the one or more possible procedures are identified by fuzzy logic.

11. The method of claim 9, wherein the one or more possible procedures include for each component of the procedure: a function, one or more extension points, limitations and sample usage codes.

12. A non-transitory computer readable medium having executable instructions stored thereon to perform a method, the method comprising:

receiving a request for a procedure, the procedure including two or more components;

identifying one or more possible procedures based on the request;

building a procedure based on the identified one or more possible procedures, wherein building the procedure includes adding extension code to a first component of the first possible procedure at an extension point of the first component to modify the first possible procedure and output a reuse component, wherein the extension point is a pre-defined location in a standard view virtual data model of the component;

validating the reuse component in the built procedure;

converting the validated built procedure to a binary artificial, wherein the binary artificial is a runtime object in a binary format; and storing the binary artificial.

13. The medium of claim 12, wherein the one or more possible procedures are identified by fuzzy logic.

14. The medium of claim 12, wherein the one or more possible procedures include for each component of the procedure: a function, one or more extension points, limitations and sample usage codes.

* * * * *